United States Patent [19]

Quick et al.

[11] Patent Number: 4,496,335
[45] Date of Patent: Jan. 29, 1985

[54] PULLEY CONSTRUCTION AND METHOD OF MAKING THE SAME

[75] Inventors: Terrence R. Quick, Springfield; Joseph P. Miranti, Jr., Porter Township; Christian County; Randy C. Foster, Springfield, all of Mo.

[73] Assignee: Dayco Corporation, Dayton, Ohio

[21] Appl. No.: 449,046

[22] Filed: Dec. 13, 1982

[51] Int. Cl.³ .............................................. F16H 11/06
[52] U.S. Cl. ...................................... 474/15; 188/298; 474/46; 267/136
[58] Field of Search ........................ 474/15, 13, 11, 28, 474/46, 43; 29/159 R, 434; 308/DIG. 8, DIG. 7, 216; 188/298; 267/136; 192/109 A, 109 D, 105 B; 73/514, 522

[56] References Cited

U.S. PATENT DOCUMENTS

| | | | |
|---|---|---|---|
| 2,810,296 | 10/1957 | Long | 474/28 |
| 2,907,560 | 10/1959 | Stedman | 73/522 |
| 3,375,908 | 4/1968 | Chaput et al. | 188/298 |
| 4,056,015 | 11/1977 | Ludolph et al. | 474/28 |
| 4,102,214 | 7/1978 | Hoff | 474/12 |
| 4,348,197 | 9/1982 | Oliver | 474/28 |

FOREIGN PATENT DOCUMENTS

| | | | |
|---|---|---|---|
| 628389 | 7/1961 | Canada | 474/28 |
| 666942 | 2/1952 | United Kingdom . | |
| 845723 | 9/1960 | United Kingdom | 474/28 |

*Primary Examiner*—Stephen J. Novosad
*Assistant Examiner*—Mark J. DelSignore
*Attorney, Agent, or Firm*—Joseph V. Tassone

[57] ABSTRACT

A pulley construction and method of making the same are provided, the pulley construction having a pair of opposed flanges respectively provided with surfaces for engagement with a V-belt construction when the V-belt construction is disposed therebetween. The pulley construction has structure for moving one of the flanges axially relative to the other of the flanges either in a direction toward the other flange or in a direction away from the other flange and has a fluid dampening unit separate from the structure for moving and being operatively associated with the one flange to dampen the axial movement of that one flange in either of the directions relative to the other flange with a restrictive force, the dampening unit comprising a flexible bladder having one part thereof operatively interconnected to that one flange.

10 Claims, 8 Drawing Figures

PULLEY CONSTRUCTION AND METHOD OF MAKING THE SAME

BACKGROUND OF THE INVENTION

1. Field of the Invention

This invention relates to an improved pulley construction and to a method of making such a pulley construction or the like.

2. Prior Art Statement

It is known to provide a pulley construction having a pair of opposed flanges respectively provided with surface means for engagement with a V-belt construction when the V-belt construction is disposed therebetween, the pulley construction having means for moving one of the flanges axially relative to the other of the flanges either in a direction toward the other flange or in a direction away from the other flange and having fluid dampening means separate from the means for moving and being operatively associated with that one flange to dampen the axial movement of the one flange relative to the other flange in either of directions with a restrictive force. For example, see the U.S. Pat. to Oliver, No. 4,348,197 and the British Patent to Croft, No. 666,942 wherein the fluid dampening means thereof each comprises a piston and cylinder arrangement.

It is also known to provide a speed responsive pulley construction wherein the means for axially moving the one flange of the pulley construction relative to the other flange thereof comprises a plurality of elements that respectively act in raceway means of the one flange and against a cooperating non-axially movable member of the pulley construction. For example, see the U.S. Pat. to Hoff, No. 4,102,214.

It is also known to provide a pneumatically operated flexible bladder-like member for moving the axially movable flange of a pulley construction relative to the fixed flange thereof. For example, see the U.S. Pat. to Long, No. 2,810,296.

SUMMARY OF THE INVENTION

It is one feature of this invention to provide an improved pulley construction that has fluid dampening means for dampening the axially movement of one flange of the pulley construction relative to other flange thereof with a restrictive force.

In particular, it is well known that in a variable speed tramsmission which is driven by a V-belt construction or the like, it is desirable to achieve a smooth consistent movement while shifting to decrease wear on the belt construction and the sheaves or pulley constructions. This is particularly a problem in a high ratio or a high load drive, such as a continuously variable transmission for a vehicle, etc.

Thus, is was found according to the teachings of this invetion that vibrations and shock load motion could be dampened by air and that the air could be contained between a flexible bladder and a housing of the pulley construction to be forced out or drawn in through orifice means formed in the housing whereby such restricted air flow through the orifice means would cushion the movement of the movable flange relative to the fixed flange in both directions thereof.

For example, one embodiment of this invention provides a pulley construction having a pair of opposed flanges respectively provided with surfce means for engagement with a V-belt construction when the V-belt construction is disposed therebetween, the pulley construction having means for moving one of the flanges axially relative to the other flange either in a direction toward the other flange or in a direction away from the other flange and having fluid dampening means separate from the means for moving and being operatively associated with the one flange to dampen the axial movement of the one flange in either of the directions relative to the other flange with a restrictive force. The dampening means comprises a flexible bladder having one part thereof operatively interconnected to the one flange.

Accordingly, it is an object of this invention to provide an improved pulley construction having one or more of the novel features of this invention as set forth above or hereinafter shown or described.

Another object of this invention is to provide an improved method of making such a pulley construction, the method of this invention having one or more of the novel features of this invention as set forth above or hereinafter shown or described.

Another object of this invention is to provide an improved combination of a V-belt construction and the pulley construction of this invention, the improved combination of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
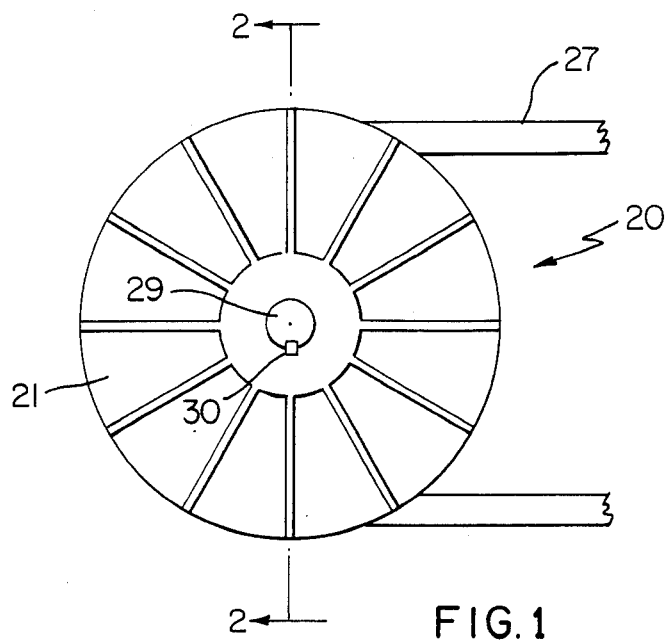
FIG. 1 is a fragmentary side view of the improved pulley construcion of this invention being utilized in combination with a V-belt construction.

While the various features of this invention are hereinafter illustrated and described as providing a pulley construction for continuously variable transmission purposes and the like, it is to be understood that the various features of this invention can be utilized singly or in any combination thereof to provide a pulley construction for other belt systems as desired.

Therefore, this invention is not to be limited to only the embodiments illustrated in the drawings, because the drawings are merely utilized to illustrate one of the wide variety of uses of this invention.

Figure 2:
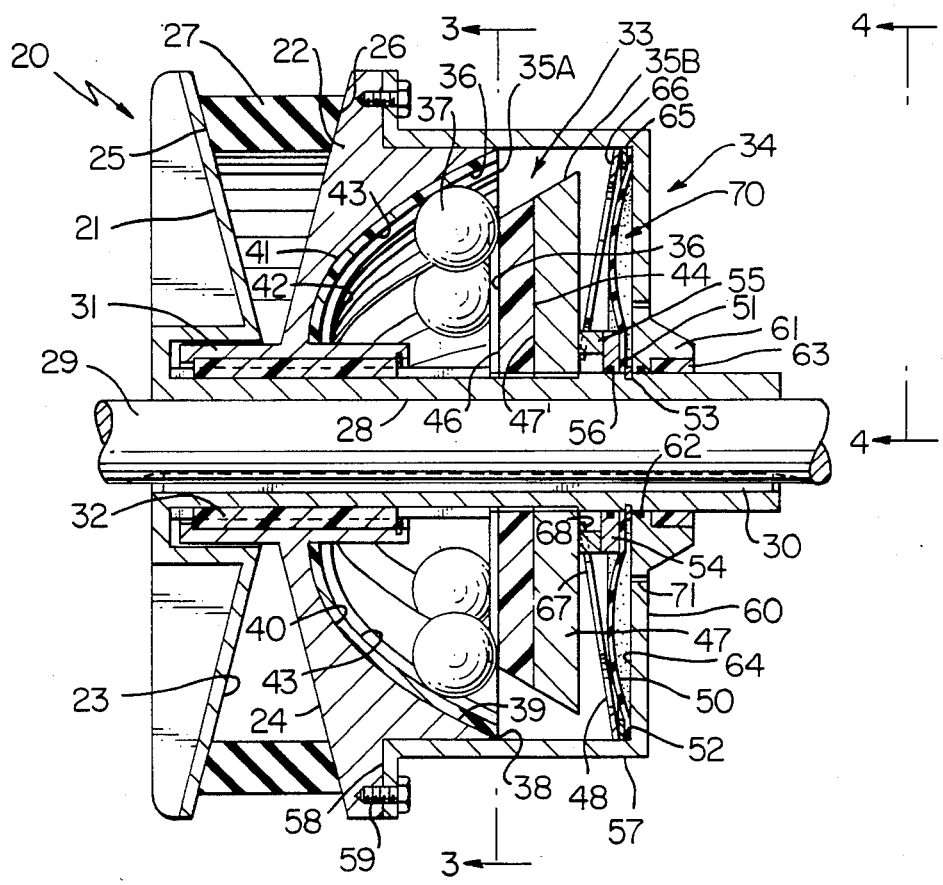
FIG. 2 is an enlarged fragmentary cross-sectional view taken on line 2—2 of FIG. 1.
Figure 3:
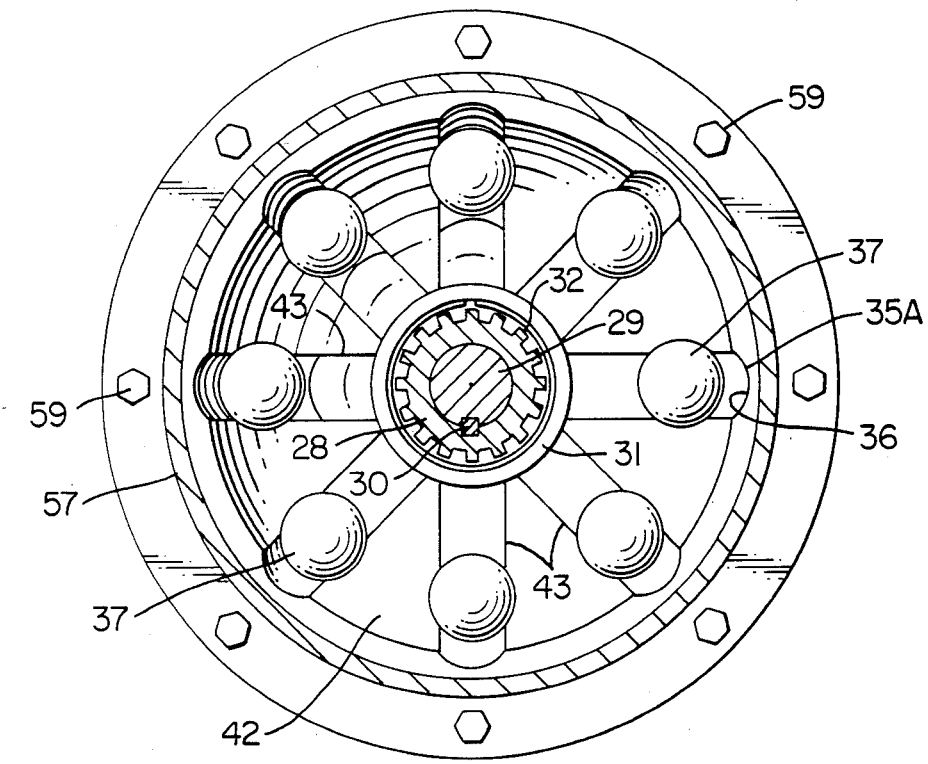
FIG. 3 is a cross-sectional view taken on line 3—3 of FIG. 2.

Referring now to FIGS. 1 and 2, the improved pulley construction of this invention is generally indicated by the reference numeral 20 and comprises a pair of opposed flanges or pulley sections 21 and 22 respectively provided with angled surface means 23 and 24 for respectively engaging the angled sides 25 and 26 of a conventional V-belt construction 27 disposed therebetween whereby the pulley construction 20 either drives the belt construction 27 or is driven by a belt construction 27 in a manner well known in the art.

The pulley construction 20 has a substantially cylindrical hub 28 that is adapted to telescopically receive part of a shaft 29 therein and be coupled thereto so as to rotate in unison therewith in any suitable manner, such as by a keyway member 30 in a manner well known in the art, whereby the pulley construction 20 is adapted to drive the shaft 29 or be driven by the shaft 29 as the case may be.

The flange 21 of the pulley construction 20 is fixed to the hub 28 so as to rotate in unison therewith and be non-axially movable relative thereto, the flange 21 being illustrated in the drawings as being integral and one-piece with the hub 28 but could be formed separate therefrom and be subsequently secured thereto in any suitable manner.

The other flange 22 of the pulley construction 20 has a substantially cylindrical hub portion 31 telescoped over the hub 28 of the pulley construction 20 and is splined thereto with antifriction spline means 32 so as to cause the flange 22 to rotate in unison with the hub 28 while being axially movable relative thereto in a manner well known in the art.

The pulley construction 20 has means that is generally indicated by the reference numeral 33 for causing axial movement of the flange 22 relative to the flange 21 in a manner hereinafter set forth and has fluid dampening means that is generally indicated by the rreference numeral 34 for dampening that axial movement of the flange 22 relative to the flange 21 with a restrictive force as will be apparent hereinafter.

The means 33 for axially moving the flange 22 relative to the flange 21 of the pulley construction 20 of this invention is a speed responsive means that comprises raceway means 35A and 35B respectively having surface means 36 and movable element means 37 disposed against the surface means 36 of the raceway means 35A and 35B for movement in the raceway means 35A and 35B.

The raceway means 35A and 35B have the surface means 36 thereof formed from polymeric material while the element means 37 comprises a plurality free rolling weight such as steel balls which may be uncovered as shown or covered with a layer or coating of polymeric material.

In this manner, the polymeric material forming the surface means 36 of the raceway means 35A and 35B will absorb some of the vibrations and shock loads of the pulley construction 20 particularly when the pulley construction 20 is being utilized for continuously variable transmission purposes and the like and the continuously variable transmission is being shifted as is well known in the art.

If desired, the polymeric material for the raceway means 35 could be reinforced, such as with glass fibers or the like, so as to combine the features of good strength with a low friction bearing surface.

The polymeric material of the raceway means 35A and 35B dampen out vibrations and shock load motion by avoiding metal to metal contact with the steel balls 37.

The feature of utilizing polymeric material for the raceway means 35A and 35B does not form any part of this invention as such feature is disclosed and claimed in the copending patent application, Ser. No. 449,045, filed Dec. 13, 1982. Thus, it is to be understood that polymeric or non-polymeric raceway means 35A and 35B can be utilized for the pulley construction 20 of this invention. Nevertheless, it is believed that by utilizing the polymeric raceway means 35A and 35B, the pulley construction 20 of this invention will have its vibrations and shock loads be more absorbed than when just the fluid dampening means 34 of this invention is being utilized.

The movable flange 22 of the pulley construction 20 has its rear surface 38 interrupted by a recess 39 that defines a substantially bowl-shaped interior surface 40 thereof that is substantially smooth and arcuate while being concentrically disposed about the hub portion 31 thereof.

Figure 7:
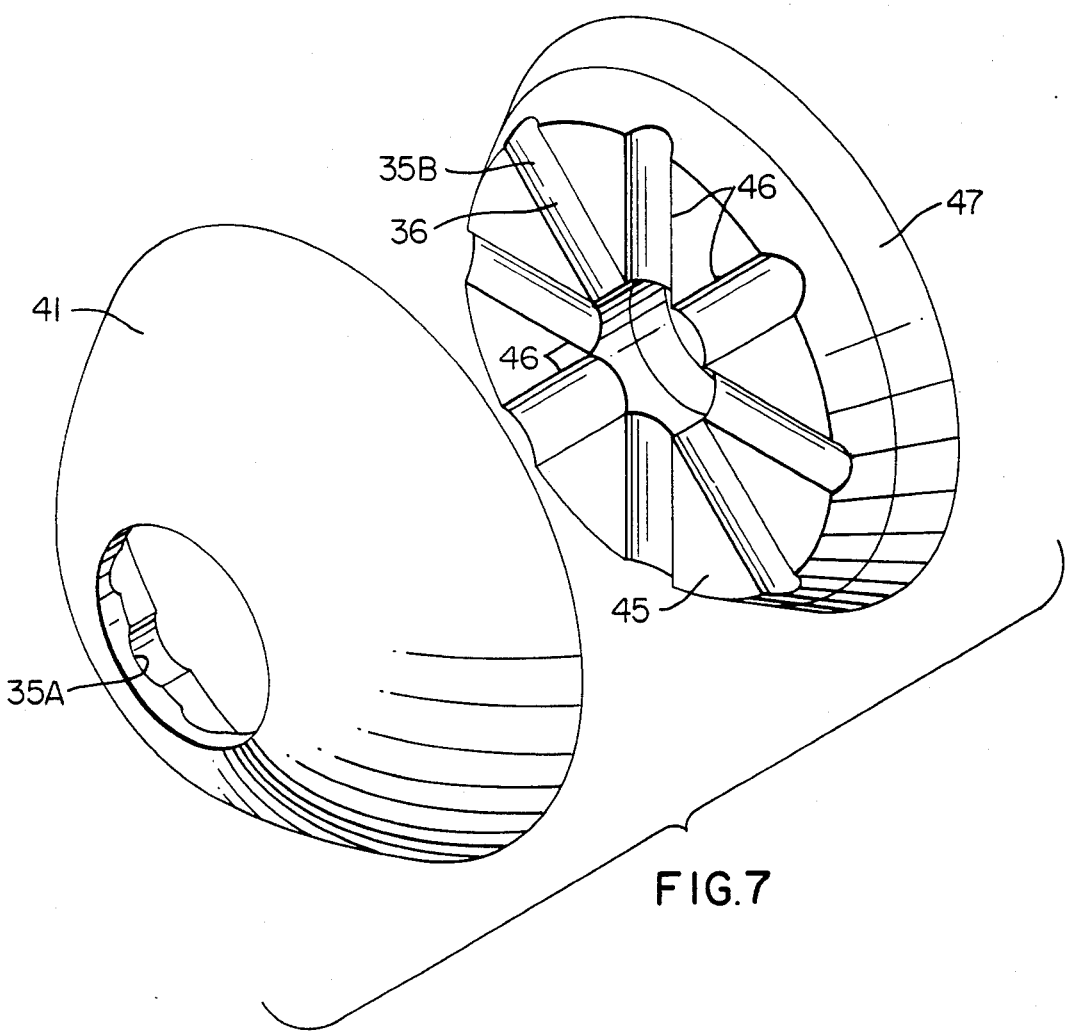
FIG. 7 is an exploded perrspective view of the raceway members of the pulley construction of FIGS. 1–6.

The raceway means 35A is adapted to be molded in the bowl shape illustrated in the drawings and has an outside substantially smooth surface 41 as illustrated in FIG. 7 that is adapted to be secured by adhesive means or other fastening means against the surface 40 of the flange 22 so as to be carried thereby whereby the flange 22 provides a backup to the polymeric material of the raceway means 35A so as to increase the strength of the polymeric material of the raceway means 35A and decrease deflections thereof caused by the action of the balls 37 moving thereagainst.

The inside surface 42 of the molded polymeric raceway member 35A has a plurality of radially disposed raceways or tracks 43 in which the balls 37 are adapted to move or roll in a manner well known for speed responsive pulley constructions, such as the pulley construction in the aforementioned U.S. Pat. to Hoff, No. 4,102,214 whereby this patent is being incorporated into this disclosure by this reference thereto.

To other raceway means 35B of the pulley construction 20 is formed in substantially flat disc form so as to have a substantially flat rear surface 44 and a substantially flat and radially grooved front surface 45 so as to be provided with a plurality of tracks 46 in which the steel balls 37 are adapted to move in a manner hereinafter set forth.

A substantially flat metallic disc-like member 47 has a front flat surface 47' against which the rear surface 44 of the raceway member 35B is secured by adhesive means, fastening means or the like so as to be supported thereby to thereby minimize deflection of the polymeric raceway member 35B and provide additional strength therefore, the plate like member 47 being secured in a fixed position on the hub 28 so as to rotate therewith while being non-axially movable relative thereto.

Thus, the raceway means 35B, while rotating in unison with the hub 28, is non-axially movable relative thereto whereas the raceway means 35A carried by the flange 22 is axially movable on the hub means 28 while being rotatable in unison therewith.

Figure 5:
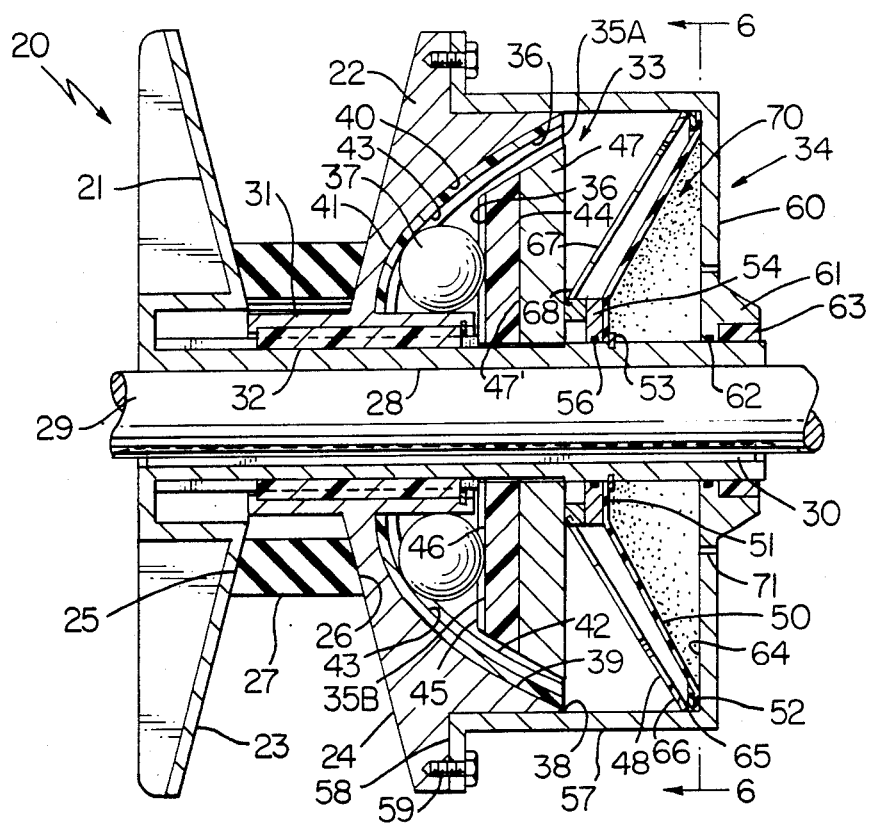
FIG. 5 is a view similar to FIG. 2 and illustrates the pulley construction in another operating condition thereof.

In this manner, the speed of rotation of the pulley construction 20, either by being driven by the V-belt construction 27 or by the shaft 29, controls the spacing between the surfaces 23 and 24 of the flanges 21 and 22 through the speed responsive means 33 so that when a low speed of rotation is being provided for the pulley construction 20, the steel balls 37 are disposed in their most radially in position as illustrated in FIG. 5 and the flange 22 is in its most axially spaced position from the flange 21 whereby the V-belt construction 27 is operating with its narrowest diameter about the pulley construction 20.

Howeverr, as the speed of rotation of the pulley construction 20 increases, the steel balls 37 are thrown outwardly by a greater centrifugal force and thereby move outward in the tracks 43 and 46 of the raceway means 35A and 35B in the manner illustrated in FIG. 2 to cause the flange 22 to be axially moved toward the flange 21 and thereby cause the V-belt construction 27 to ride outwardly on the surfaces 23 and 24 until the same provides the maximum diameter for the V-belt construction 27 in the pulley construction as illustrated in FIG. 2, such movement of the flange 22 toward the flange 21 being in opposition to the force of a spring 48 in a manner hereinafter set forth.

Conversely, as the speed of rotation of the pulley construction 20 decreases so that the balls 37 are not being thrown radially outwardly with as great a centrifugal force as before, the force of the spring 48 moves the flange 22 away from the flange 21 and causes the balls 37 to move radially inwardly in the tracks 43 and 46 to permit the flange 22 to so move away from the flange 21 whereby it can be seen that the spacing of the flange 22 relative to the flange 21 is in relation to the speed of rotation of the pulley construction 20.

As previously stated, it is one feature of this invention to provide the fluid dampening means 34 for dampening the axial movement of the flange 22 relative to the flange 21 as the flange 22 is being moved either toward or away from the flange 21 by the speed responsive means 33 so as to dampen vibrations and shock load motion of the pulley construction 20.

Accordingly, the details of the fluid dampening means 34 will now be described.

The fluid dampening means 34 comprises a flexible bladder 50 that is formed of polymeric material, such as rubber, and is substantially like a flexible diaphragm, the bladder 50 having an inner periphery 51 and an outer periphery 52. The inner periphery 51 of the bladder 50 is held against a C-ring 53 carried by the hub 28 by a disc-like member 54 that has a plurality of extensions 55 disposed in a circular array and abutting the plate 47. The disc 54 carries an annular seal member 56 with seals against the hub 28 for a purpose hereinafter set forth.

The fluid dampening means 34 includes a cup-shaped housing member 57 having its open end 58 secured to the axially movable flange 22 in any suitable manner, such as by the fastening members 59 as illustrated. The cup-shaped member 57 has its closed end 60 provided with an inner peripheral or hub portion 61 telescopically disposed on the hub 28 and carrying an annular seal means 62 as well as a sliding seal means 63 so that while the cup-shaped housing member 57 will rotate in unison with the hub 28, the cup-shaped housing member is axially movable relative thereto as the housing member 57 is carried by the axially movable flange 22. In this manner, the housing member 57 is sealed to the hub 28 by the seal means 62 for a purpose hereinafter described.

Figure 6:
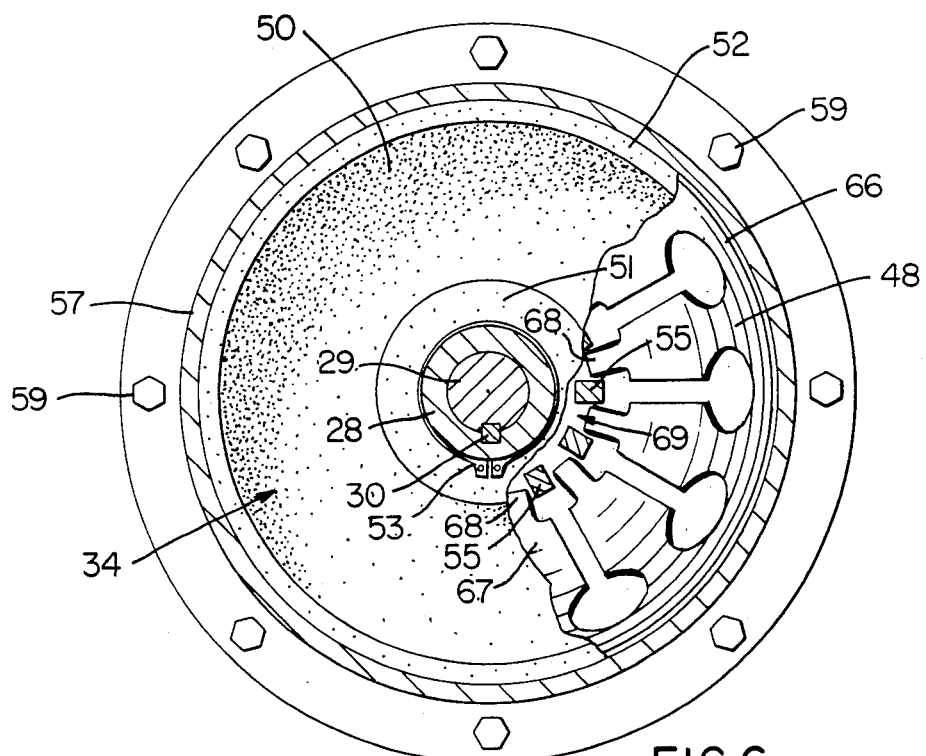
FIG. 6 is a cross-sectional view, partially broken away, and is taken on line 6—6 of FIG. 5.

The outer peripheral portion 52 of the flexible bladder 50 is held against the inside surface 64 of the closed end wall 60 of the housing member 57 by a retainer ring 65 urged against the outer periphery 52 of the flexible bladder 50 by the outer end 66 of the bladder spring 48 which has its inner end 67 provided with a plurality of fingers 68 that extent through the spaces 69 between the extensions 55 of the plate member 54 as illustrated in FIG. 6.

In this manner, the force of the bladder spring 48 maintains the outer peripheral portion 52 of the diaphagm or bladder 50 in sealing engagement against the end wall surface 64 of the housing member 57 so that the bladder 50 cooperates with the surface 64 of the housing member 57 to define a fluid chamber 70 therebetween, the inner portion of the chamber 70 being closed by the hub 28 between the seal members 56 and 62 carried respectively by the plate 54 and housing means 57 as illustrated.

In this manner, the volume of the chamber 70 varies as the axial position of the flange 22 relative to the fixed flange 21 varies as illustrated respectively in FIGS. 2 and 5 for a purpose hereinafter set forth.

Figure 4:
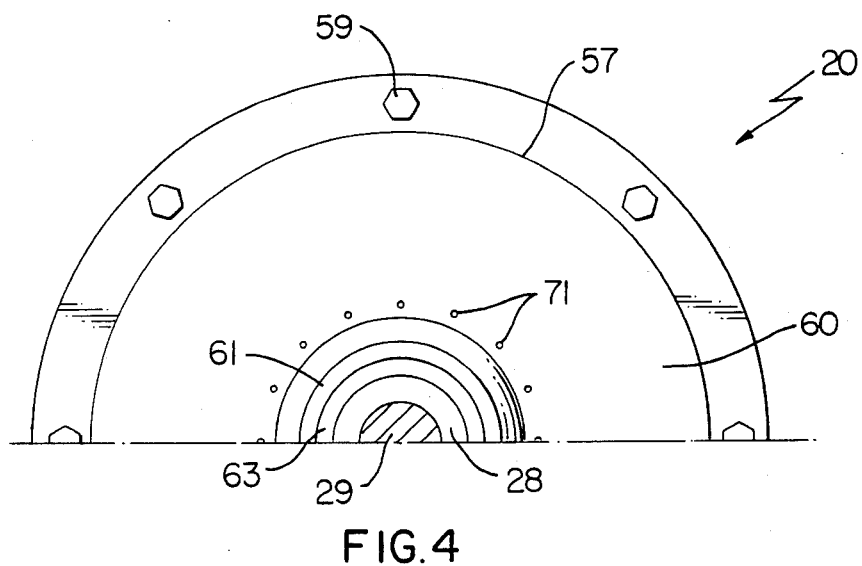
FIG. 4 is a rear view of the pulley construction illstrated in FIG. 2 and is taken in the direction of the arrow 4—4 of FIG. 2.

The chamber 70 of the fluid dampening means 34 is interconnected to the exterior of the pulley construction 20 by a plurality of orifices 71 formed through the end wall 60 of the housing means 57 and being disposed in the circular array as illustrated in FIG. 4, the orifices 71 being restrictive in size so that as the volume of the chamber 70 changes, either air is being forced from the chamber 70 out through the orifices 71 as the volume decreases or is being drawn from the exterior of the pulley construction 20 through the orifices 71 as the volume increases, such changes are restricted by the amount of air flow through the orifices 71. Such increase or decrease in the volume of the chamber 70 depends upon the direction of the axial movement of the flange 22 relative to the fixed flange 21 as will be apparent hereinafter.

Therefore, it can be seen that while the fluid dampening means 34 of this invention utilizes air as the fluid thereof, it is to be understood that the fluid dampening means 34 of this invention can utilize another fluid, such as a liquid, as long as the system is well sealed and fluid flow is contained in a closed system.

In any event, it can be seen that it is a relatively simple method of this invention to make the pulley construction 20 of this invention which is adapted to operate in a manner now to be described.

When the pulley construction 20 of this invention has the V-belt construction 27 disposed in engagement with the surfaces 23 and 24 of the flanges 21 and 22 by being disposed therebetween as illustrated in FIGS. 1 and 2, the pulley construction 20 is adapted to be driven or rotated by the V-belt construction 27 or be driven or rotated by the shaft 29 so as to drive the V-belt construction 27 in a manner well known in the art.

In any event, as the pulley construction 20 is rotating, the speed of rotation thereof causes the balls 37 to be thrown radially outwardly by a centrifugal force and when the force of the balls 37 tending to move outwardly in the tracks 43 and 46 of the polymeric raceway means 35A and 35B is sufficient to overcome the force of the bladder spring 48 tending to maintain the housing 57 and, thus, the flange 22 in its furthest axial position from the flange 21 as illustrated in FIG. 5, the balls 37 force against the arcuate surface of the tracks 43 of the raceway means 35A to axially move tthe flange 22 toward the flange 21 and force the belt 27 outwardly to a larger diameter position thereof in the pulley construction 20 in the manner illustrated in FIG. 2. Such axial movement of the flange 22 toward the flange 21 continues as the speed of rotation of the pulley 20 increases until the balls 37 reach the position illustrated in FIG. 2 at which time the housing means 27 is disposed in abutting relation against the C-member 53 of the hub 28 so that further movement of the housing means 57 and, thus, of the flange 22 toward the flange 21 is prevented whereby the V-belt construction 27 is disposed in the greatest diameter position thereof in the pulley construction 20 as illustrated in FIG. 2. Conversely, any slowing in the speed of rotation of the pulley construction 20 permits the spring 48 to overcome some of the centrifugal force of the balls 37 to axially move the flange 22 away from the flange 21 and thereby decrease the operating diameter of the V-belt construction 27 in the pulley construction 20.

As previously stated, any axial movement of the flange 22 relative to the flange 21 causes a change in the volume of the chamber 70 as the outer peripheral portion 52 of the bladder 50 is interconnected to the housing 57 and, thus, is operatively interconnected to the axially movable flange 22.

Thus, when the speed responsive means 33 cause the flange 22 to axially move away from the flange 21 so as to cause an increase in the volume of the chamber 70, air from the exterior of the housing 57 must be drawn into the chamber 70 through the orifices 71 and since the orifices 71 are restricting, the movement of the flange 22 axially away from the flange 21 is dampened by the restricting force of the dampening means 34.

When the flange 22 is axially moved toward the flange 21 by the speed responsive means 33, a decrease in the volume of the chamber 70 takes place and thereby causes the air therein to be forced out through the orifices 71 and since the orifices 71 are restricting, such movement of the flange 22 toward the flange 21 is dampened by the restricting force of the dampening means 34.

Of course, the amount of restricting force provided by the fluid dampening means 34 could be made adjustable by either adding to or subtracting from the number of operating orifices 71 as desired.

Figure 8:
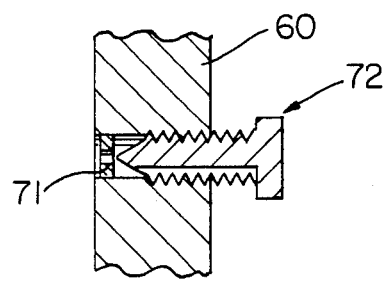
FIG. 8 is an enlarged fragmentary cross-sectional view illustrating another pulley construction of this invention.

In fact, the amount of restriction provided by each orifice 71 could be adjustably controlled, such as by utilizing a conventional needle valve means that is generally indicated by the reference numeral 72 in FIG. 8 whereby the amount of dampening or restricting force of the pulley construction 20 of this invention can be adjustable.

Therefore, it can be seen that not only does the fluid dampening means 34 cushion the axial movement of the flange 22 relative to the flange 21 so as to dampen vibrations and shock load motion of the pulley construction 20, but also the polymeric raceway means 35A and 35B cushion the vibrations and shock load motion caused by the element means 37 moving relative to the pulley 20 and thereby causing such axial movement of the movable flange 22 relative to fixed flange 21.

While the raceway means 35A and 35B have been illustrated and described as operating with eight tracks 43 and 44, it is to be understood that the raceway means 35A and 35B could be made with any desired number of tracks 43 and 46 and still will perform their shock and vibrating absorbing function as well as their speed responsive function as previously set forth.

Therefore, it can be seen that this invention not only provides an improved pulley construction and method of making the same, but also this invention provides an improved combination of a V-belt construction and a pulley construction.

While the forms and methods of this invention now preferred have been illustrated and described as required by the Patent Statute, it is to be understood that other forms and method steps can be utilized and still fall within the scope of the appended claims.

What is claimed is:

1. In a pulley construction having a pair of opposed flanges respectively provided with surface means for engagement with a V-belt construction when said V-belt construction is disposed therebetween, said pulley construction having means for moving one of said flanges axially relative to the other of said flanges either in a direction toward said other flange or in a direction away from said other flange, said pulley construction having fluid dampening means separate from said means for moving and being operatively associated with said one flange to dampen said axial movement of said one flange in either of said directions relative to said other flange with a restrictive force, the improvement within said dampening means comprises a flexible bladder having one part thereof operatively interconnected to said one flange.

2. A pulley construction as set forth in claim 1 wherein said pulley construction has a section that is fixed from axial movement relative to said one flange, said flexible bladder having another part thereof operatively interconnected to said section.

3. A pulley construction as set forth in claim 1 wherein said pulley construction has a housing means cooperating with said bladder to define a fluid chamber therebetween whereby said housing means and said bladder comprise said fluid dampening means.

4. A pulley construction as set forth in claim 3 wherein said housing means has orifice means passing therethrough and leading from said fluid chamber to the exterior of said housing means, said one flange changing the volume of said fluid chamber by moving said one part of said bladder whereby fluid flow between said chamber and said exterior of said pulley construction through said orifice means provides said restrictive force for dampening said axial movement of said one flange relative to said other flange.

5. A pulley construction as set forth in claim 4 wherein said orifice means comprise a plurality of openings through said hosing means.

6. A pulley construction as set forth in claim 4 wherein said orifice means has adjusting means for changing the flow rate therethrough and, thus, for changing said restrictive force.

7. A pulley construction as set forth in claim 4 wherein said housing means is operatively interconnected to said one flange so as to be movable therewith.

8. A pulley construction as set forth in claim 7 wherein said pulley construction has a hub means for interconnecting to a rotatable shaft, said housing means being axially movable on said hub means and having seal means disposed against said hub means, said bladder having another part thereof interconnected to said hub means, said other flange being fixed to said hub means to rotate therewith, said one flange having means interconnected to said hub means so as to be axially movable relative thereto while being rotatable therewith.

9. A pulley construction as set forth in claim 8 wherein said bladder comprises a flexible diaphragm-like member having an inner peripheral means and an outer peripheral means, said one part of said bladder comprising said outer peripheral means and said other part of said bladder comprising said inner peripheral means.

10. A pulley construction as set forth in claim 9 wherein said means for moving comprises spring means disposed between said one flange and said housing means, said spring means holding said one part of said diaphragm-like member against said housing means so as to move in unison therewith whereby said housing means operatively interconnects said one part of said diaphragm-like member to said one flange.

* * * * *